(12) United States Patent
Yao et al.

(10) Patent No.: US 11,402,880 B2
(45) Date of Patent: Aug. 2, 2022

(54) TWO-DIMENSIONAL CURVED DISPLAY

(71) Applicant: MOBILE PIXELS INC., Irwindale, CA (US)

(72) Inventors: Xiaoliang Yao, Burlington, MA (US); Wenglong Ng, Burlington, MA (US)

(73) Assignee: MOBILE PIXELS INC., Irwindale, CA (US)

( * ) Notice: Subject to any disclaimer, the term of this patent is extended or adjusted under 35 U.S.C. 154(b) by 0 days.

(21) Appl. No.: 16/985,690

(22) Filed: Aug. 5, 2020

(65) Prior Publication Data

US 2022/0043489 A1 Feb. 10, 2022

(51) Int. Cl.
*G06F 1/16* (2006.01)
*G06F 1/18* (2006.01)
*G09F 9/33* (2006.01)

(52) U.S. Cl.
CPC ............. *G06F 1/182* (2013.01); *G09F 9/33* (2013.01); *G06F 2200/161* (2013.01)

(58) Field of Classification Search
CPC ..... G06F 1/1601; G06F 1/1637; G06F 1/1656
See application file for complete search history.

(56) References Cited

U.S. PATENT DOCUMENTS

| | | | |
|---|---|---|---|
| 10,629,100 B2* | 4/2020 | Zhu | G09F 9/33 |
| 2016/0191837 A1* | 6/2016 | Huh | G06F 1/1626 348/564 |
| 2017/0027039 A1* | 1/2017 | Park | G06F 1/1601 |

* cited by examiner

*Primary Examiner* — Anthony Q Edwards
(74) *Attorney, Agent, or Firm* — Lando & Anastasi, LLP

(57) ABSTRACT

According to aspects of the disclosure, an electronic display configured to output information to a user is provided comprising a display screen curved in a first dimension and a second dimension aligned with a field-of-view of the user, the first dimension being perpendicular to the second dimension.

12 Claims, 5 Drawing Sheets

TWO-DIMENSIONAL CURVED DISPLAY

BACKGROUND

1. Field of the Disclosure

At least one example in accordance with the present disclosure relates generally to electronic displays.

2. Discussion of Related Art

Electronic display devices may be used to display output information to users. For example, an electronic display, or "monitor," may be connected to a desktop computing device and may display output information received from the desktop computing device. Electronic displays thus provide a user interface for users to interact with computing devices.

SUMMARY

According to at least one aspect of the present disclosure, an electronic display configured to output information to a user is provided, the electronic display comprising a display screen curved in a first dimension and a second dimension aligned with a field-of-view of the user, the first dimension being perpendicular to the second dimension.

In some examples, the display screen is spherical. In various examples, a width of the display screen is equal to a length of the display screen. In at least one example, a width of the display screen is greater than a length of the display screen. In some examples, the display screen is aspherical. In various examples, a width of the display screen is equal to a length of the display screen. In at least one example, a curvature of the display screen in the first dimension is greater than a curvature of the display screen in the second dimension. In some examples, a width of the display screen is greater than a length of the display screen. In various examples, a curvature of the display screen in the first dimension is greater than a curvature of the display screen in the second dimension. In at least one example, the width of the display screen is measured along the second dimension. In some examples, a curvature radius of the display screen is configured to be equal to a depth of the field-of-view of a viewer.

According to at least one aspect of the present disclosure, a method of facilitating maximization of an information density provided by a computer system is provided, the method comprising providing a display having a display screen curved in a plurality of dimensions to output electromagnetic radiation to a user, the electromagnetic radiation being aligned with a field-of-view of the user.

In at least one example, the method includes providing instructions to the user to connect the display to the computer system to enable the display screen to receive display information from the computer system. In various examples, the method includes providing instructions to the user to configure the display to enable the display screen to output the electromagnetic radiation based on the received display information. In some examples, the display screen includes an array of pixels, and wherein outputting the electromagnetic radiation to the user includes outputting first electromagnetic radiation from a first plurality of pixels of the array of pixels, the first plurality of pixels being arranged along an arc curving along a first dimension of the plurality of dimensions, and outputting second electromagnetic radiation from a second plurality of pixels of the array of pixels, the second plurality of pixels being arranged along an arc curving along a second dimension of the plurality of dimensions, the second dimension being perpendicular to the first dimension.

In at least one example, a focal point of the first electromagnetic radiation is equal to a focal point of the second electromagnetic radiation. In some examples, an arclength of the first plurality of pixels is equal to an arclength of the second plurality of pixels. In various examples, an arclength of the first plurality of pixels is not equal to an arclength of the second plurality of pixels. In at least one example, a focal point of the first electromagnetic radiation is not equal to a focal point of the second electromagnetic radiation.

According to one aspect of the disclosure, an electronic display is provided comprising means for outputting electromagnetic radiation with an information density greater than that of an electronic display curved in a single dimension.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
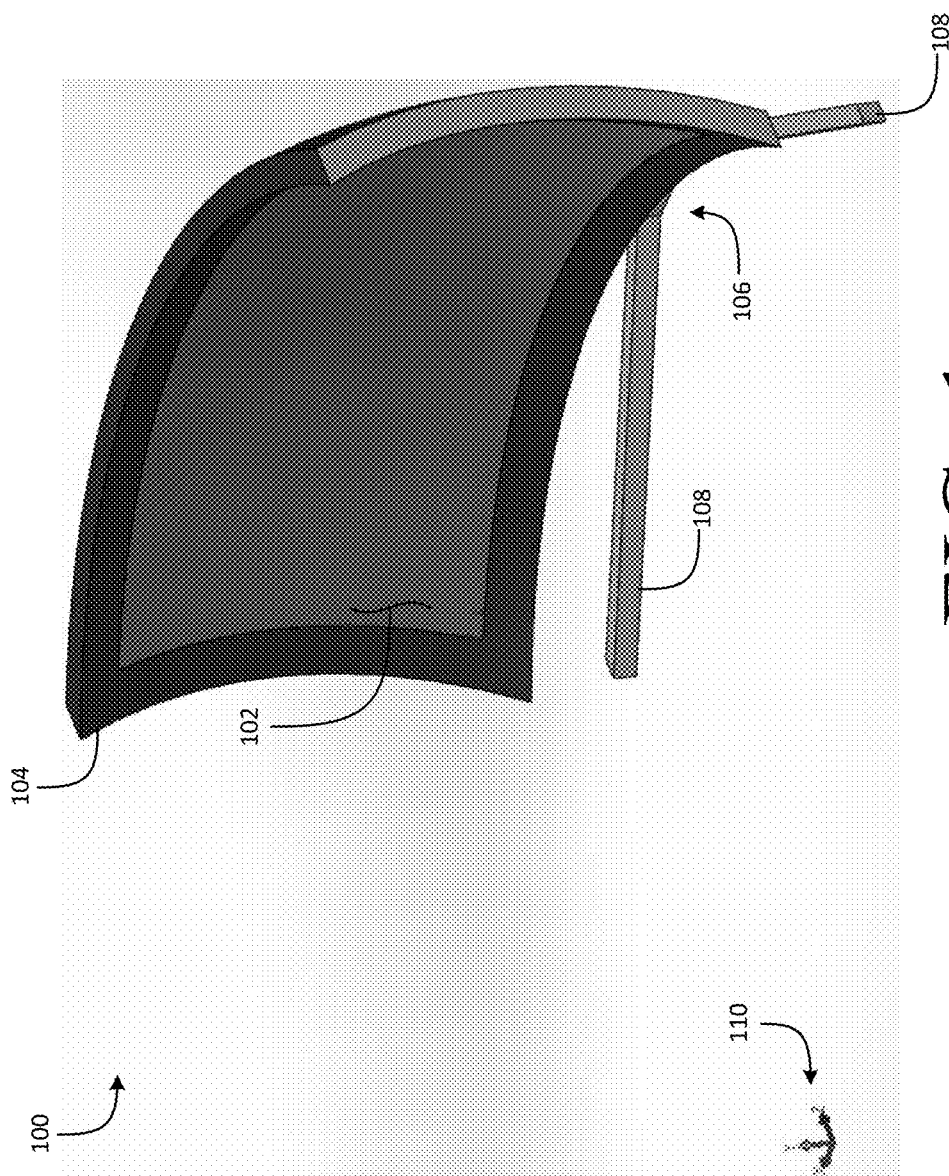
FIG. 1 illustrates a perspective view of a display according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Electronic display devices, also referred to simply as "displays," or monitors," can be implemented to display information to users. For example, a display may include an array of output elements, such as pixels, each configured to output a portion of a display output as visible electromagnetic radiation.

A size, shape, and orientation of the display may be selected based on various design considerations. Increasing a size of the display, which may include increasing a surface area of a display screen, may increase an amount of information output by the display at least because there is additional area on which to display information. However, displaying additional information does not necessarily convey more information to a user if the user cannot simultaneously view the entire display. For example, if a display is larger than a user's field-of-view, then further increasing the size of the display may not necessarily convey more information to a user. Thus, while increasing an amount of information in a user's field-of-view may be advantageous, simply increasing a size of a display yields diminishing returns.

An existing manner of increasing an amount of information in a user's field-of-view is to provide a curved monitor rather than a conventional flat monitor. A flat monitor displays information in a single dimension, normal to the plane in which the display resides. For example, each pixel in a flat monitor having an array of pixels outputs information along a vector parallel to the output vectors of each other pixel.

Conversely, curved monitors do not reside in a single plane, and are instead curved such that the pixels' output information vectors are not parallel to one another. For example, a curved monitor may be curved towards a user such that the pixels' output information vectors are pointed towards a user's eyes and therefore towards the user's field-of-view. Directing the pixels' output information vectors towards a user's eyes increases an amount of information in the user's field-of-view and thus may provide more information to a user at an instantaneous point in time than a flat monitor.

However, existing curved monitors are curved in only one dimension, such as by being curved vertically or horizontally. Examples of this disclosure provide enhanced displays being curved in two dimensions. For example, certain displays described herein are curved along two perpendicular dimensions (for example, both a horizontal and vertical dimension) to maximize an amount of information provided to a user. Such displays may be referred to as, or be examples of, two-dimensional (2D) displays or monitors. Accordingly, examples provided herein maximize an information density of a display by increasing a proportion of pixels having output information vectors directed toward a user.

Figure 2:
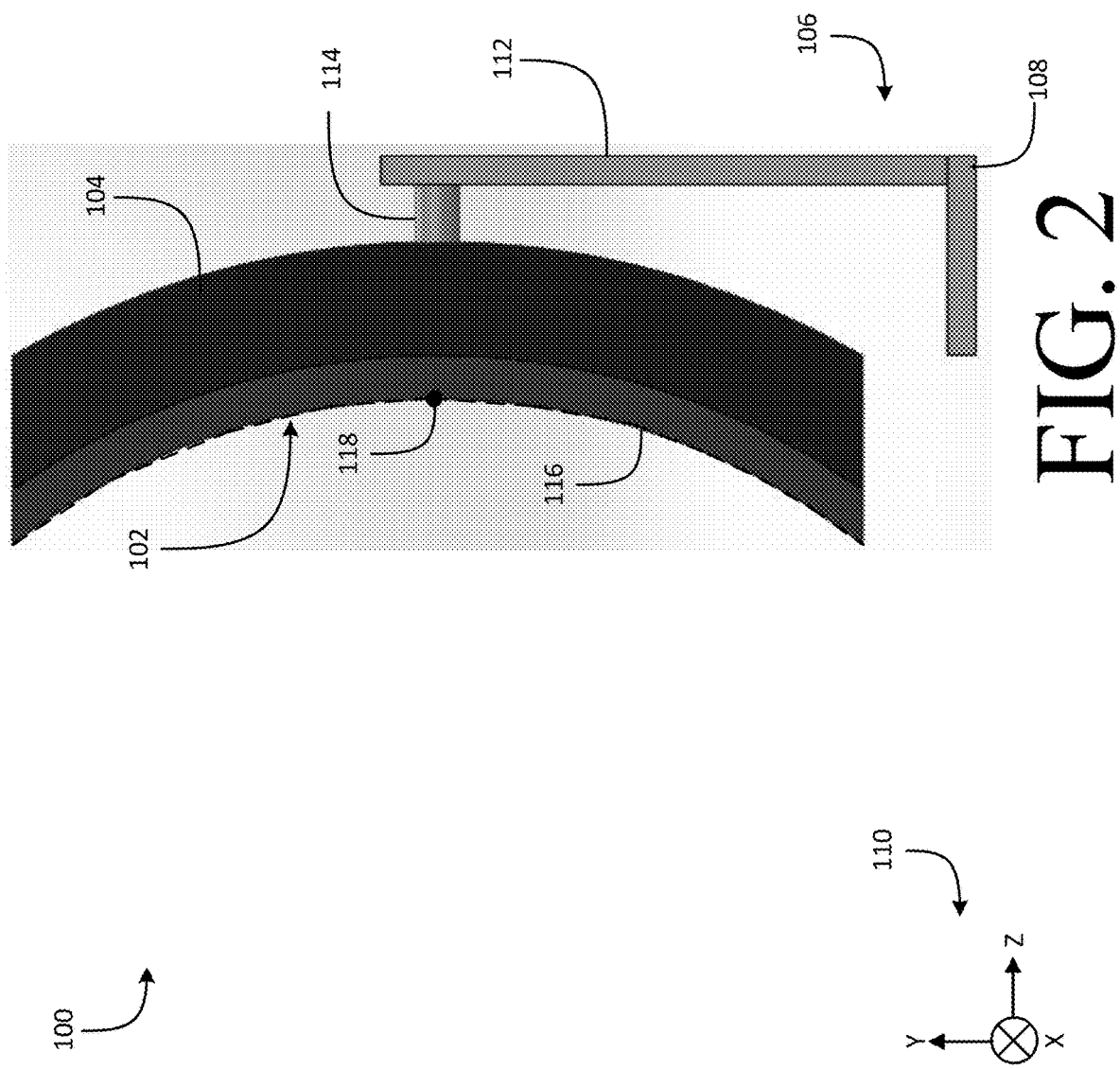
FIG. 2 illustrates a side view of the display according to an example.
Figure 3:
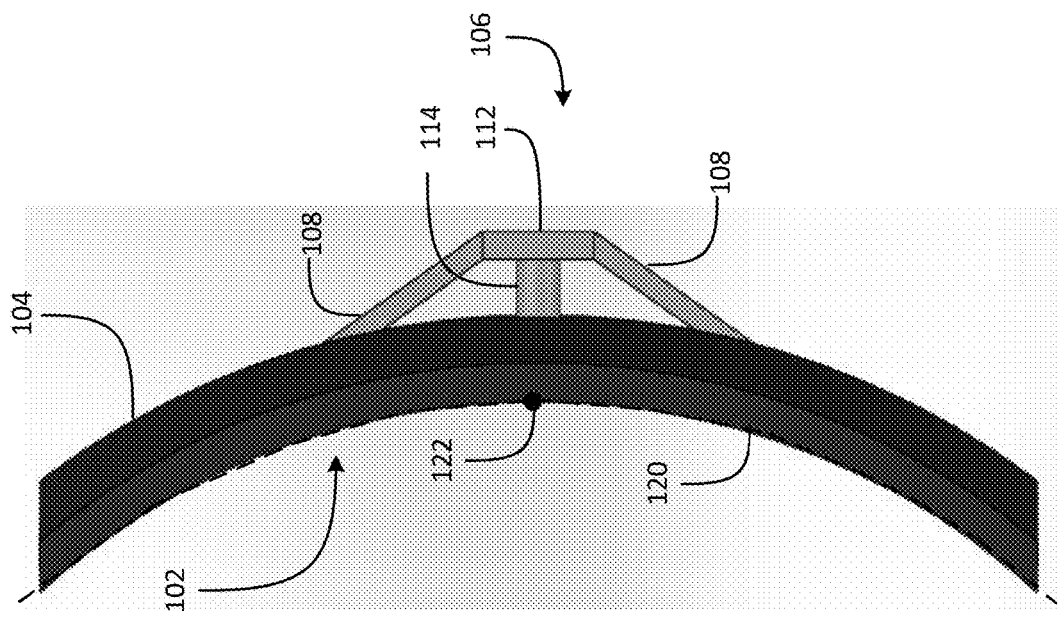
FIG. 3 illustrates a top view of the display according to an example.
Figure 4:
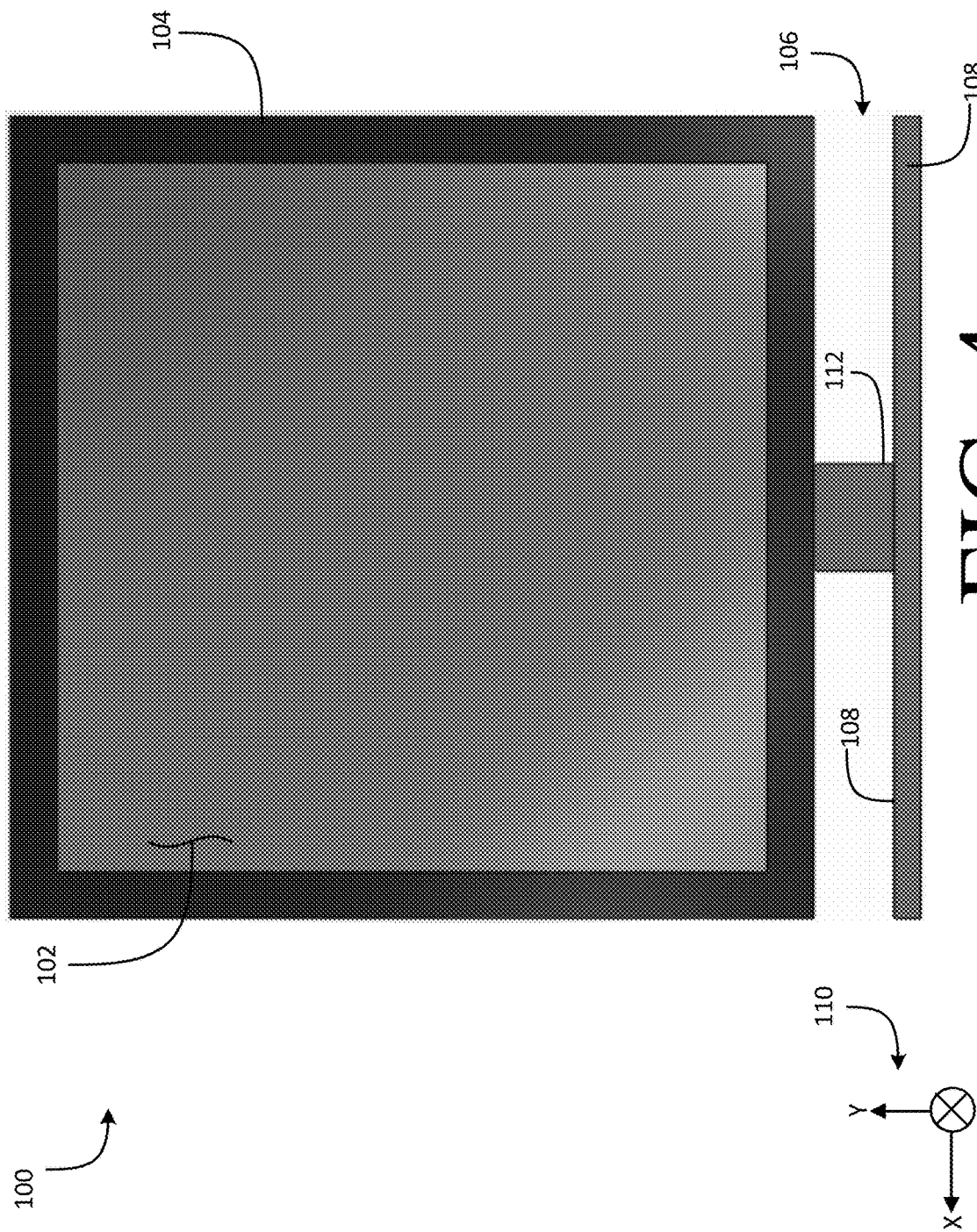
FIG. 4 illustrates a front view of the display according to an example.

FIG. 1 illustrates a perspective view of a display 100 according to an example. The display 100 includes a display screen 102, a housing 104, and a base 106 including legs 108. FIG. 1 includes a legend 110, which includes an x-axis, a y-axis, and a z-axis, each of which is perpendicular to the other. FIG. 2 illustrates a side view of the display 100 along the x-axis according to an example. As illustrated by FIG. 2, the base 106 further includes a support 112 and a connector 114. FIG. 3 illustrates a top view of the display 100 along the −y-axis according to an example. FIG. 4 illustrates a front view of the display 100 along the z-axis according to an example.

The display 100 is configured to provide output information to a user. For example, the display 100 may provide output information to a user via visible electromagnetic radiation output by the display screen 102. The display screen 102 may include an array of output elements, or pixels, each being individually addressable and capable of outputting electromagnetic radiation. For example, the display 100 may be coupled to a computing device, such as a laptop computer, desktop computer, gaming console, tablet computer, mobile computing device, and so forth, configured to provide, to the display 100, data signals encoding information to be output as output information by the display 100. The display 100 may be further configured to receive electrical power from the computing device in some examples. In some examples, the display 100 may be further configured to provide information to one or more computing devices, such as input information where the display screen 102 is a touch-sensitive display screen.

The display 100 may be coupled to one or more external computing devices via a wired and/or wireless connection. For example, the base 106 may include one or more data ports and/or wireless network interfaces configured to exchange, provide, or receive data from an external device. The display 100 may provide output information based on the received data, such as by controlling the display screen 102 to output electromagnetic radiation based on the received data. For example, providing the output information may include individually controlling each pixel of an array of pixels to output visible electromagnetic radiation as appropriate. In some examples, the display 100 includes a controller and one or more other components configured to decode received data and control an array of pixels based on the received data to provide appropriate output information.

The display 100 may further be coupled to one or more external power devices via a wired and/or wireless connection. In some examples, the display 100 may receive electrical power from the same device that provides data based on which output information is provided via the same or a different connection or medium. In other examples, the display 100 may receive electrical power from another device or external power supply, such as a mains power supply, a power conditioning device, such as an uninterruptible power supply, an energy storage device, and so forth.

The display 100 may be an example of a two-dimensional display or monitor at least because the display screen 102 curves in two perpendicular dimensions. A surface may be defined as curved along a given axis that intersects the plane where the axis and lines parallel to the axis and intersecting the plane intersect the plane at exactly two points, or lie tangent to the plane at a vertex of the plane. The display 100 is a two-dimensional display at least because the display 100 is curved along the x-axis and along the y-axis.

For example, and with reference to FIG. 2, a trace 116 indicates a curvature, or arc, of a surface of the display screen 102 along the y-axis. A plurality of pixels of the display screen 102 are arranged along the arc indicated by the trace 116, and thus output electromagnetic radiation non-parallel to one another. The display screen 102 is curved along the y-axis at least because a line parallel to the y-axis and intersecting the trace 116 either intersects the trace 116 at exactly two points, or lies tangent to the trace 116 at a vertex 118 of the trace 116. Accordingly, the display screen 102 is curved along the y-axis and may be considered to be vertically curved.

Similarly, and with reference to FIG. 3, a trace 120 indicates a curvature, or arc, of the display screen 102 along the x-axis. A plurality of pixels of the display screen 102 are arranged along the arc indicated by the trace 120, and thus output electromagnetic radiation non-parallel to one another. The display screen 102 is curved along the x-axis at least because a line parallel to the x-axis and intersecting the trace 120 either intersects the trace 120 at exactly two points, or lies tangent to the trace 120 at a vertex 122 of the trace 120. Accordingly, the display screen 102 is also curved along the x-axis and may be considered to be horizontally curved. The display 100 is therefore a two-dimensional display at least because the display screen 102 is curved along two perpendicular dimensions, including the y-axis and the x-axis.

In some examples, a curvature of the display screen 102 along the y-axis may be constant and spherical. In other examples, a curvature of the display screen 102 along the y-axis may be non-constant and aspherical. That is, a curvature of the display screen 102 along the y-axis may have a display radius that varies along the y-axis. Similarly, a curvature of the display screen 102 along the x-axis may be constant and spherical in some examples, and may be non-constant and aspherical in other examples. A curvature of the display screen 102 along the x-axis may be the same as, or differ from, a curvature of the display screen 102 along the y-axis. For example, a curvature radius of the display screen 102 along the x-axis may be between approximately 0.45 meters to 1.9 meters, and a curvature of the display screen 102 along the y-axis may be between approximately 0.25 meters and 1.05 meters.

As discussed above, the display screen 102 may include an array of pixels configured to output electromagnetic radiation. For example, the display screen 102 may include an array of light-emitting diodes (LEDs), organic light-emitting diodes (OLEDs), or other components configured to output electromagnetic radiation. A display radius of the display screen 102, or radii where the display screen 102 is aspherical, may be selected to be approximately equal to, or close to, an expected distance between the display screen 102 and a viewer or user. Where a display radius of the display screen 102 is approximately equal to the distance between the display screen 102 and a viewer, each pixel of the array of pixels may output electromagnetic radiation directly to a user's eyes such that a focal point of the electromagnetic radiation output by the array of pixels coincides approximately with the user's eyes.

In this manner, a user's field-of-view is approximately aligned with a curvature of the display screen 102 such that an information density of the display screen 102—that is, an amount of information conveyed to a user per unit area—is maximized. For example, a depth of the user's field of view (that is, a distance between the user and an object that the user is looking at) may be approximately equal to a curvature radius of the display screen 102 to maximize the information density of the display screen 102. In various examples, an information density may increase as a curvature of the display screen 102 increases (that is, as a curvature radius decreases). In various examples, an information density may be increase by at least approximately 13% relative to a display curved in one only dimension, such as in examples in which the curvature radius is minimized.

A size of the display screen 102—that is, a surface area of the display screen 102 in some examples, or a length or width of the display screen 102 in other examples—may be configured or selected based on an expected distance between the display screen 102 and a viewer. For example, a size of the display screen 102 may increase as a distance between the viewer and the display screen 102 increases at least because the viewer's field of view increases as a distance from the user increases. Consequently, a display radius of the display screen 102 may increase as a size of the display screen increases.

A length of the display screen 102 may be approximately equal to a width of the display screen 102 in some examples, and may be different from the width of the display 102 in other examples. In some examples, a length and/or width of the display screen 102 may not be constant. That is, a width of the display screen 102 along the x-axis at a first position on the y-axis may differ from a width of the display screen 102 along the x-axis at a second position on the y-axis. For example, a width of the display screen 102 at the center of the display screen 102 may be smaller than a width of the display screen 102 at the edges of the display screen. Although the display screen 102 is illustrated as being approximately rectangular in some examples, in other examples, the display screen 102 may not be rectangular. For example, the display screen 102 may be approximately elliptical.

Furthermore, while the display screen 102 appears rectangular in certain illustrations, the display screen 102 may not be rectangular were the display screen 102 to be "flattened" from a curved state. That is, if the display screen 102 were to be flattened such that the display screen 102 had zero curvature, the display screen 102 may not be rectangular. In some examples, the display screen 102 may include one or more grooves, cuts, or indentations that are exposed when the display screen 102 is flattened. For example, the grooves, cuts, and/or indentations may be added to the display screen 102 during a manufacturing process prior to curving the display screen 102. When the display screen 102 is curved from a flattened state during manufacturing, the grooves, cuts, and/or indentations may be added to enable the display screen 102 to curve to a desired state, and may be closed by the curving of the display screen 102

The housing 104, and consequently the display screen 102, may be rotatable about the connector 114. For example, the housing 104 may be rotatable about the z-axis. In other example, the housing 104 may be rotatable about the z-axis and one or both of the x-axis or the y-axis. Similarly, the connector 114 may be a telescopic connector such that the housing 104 may be moved along the z-axis via the connector 114, thus enabling a viewer to adjust a distance of the display screen 102 from the viewer. In various examples, the connector 114 houses or includes one or more wired connections. For example, the connector 114 may include one or more wired data or power connections to provide or receive data, information, and/or power to or from the housing 104.

Similarly, the support 112 may be a telescopic support such that the housing 104 may be moved along the y-axis via the support 112, thus enabling a viewer to adjust a height of the display screen 102. In various examples, the support 112 houses or includes one or more wired connections. For example, the support 112 may include one or more wired data or power connections to provide or receive data, information, and/or power to or from the housing 104 via the housing 104.

Figure 5:
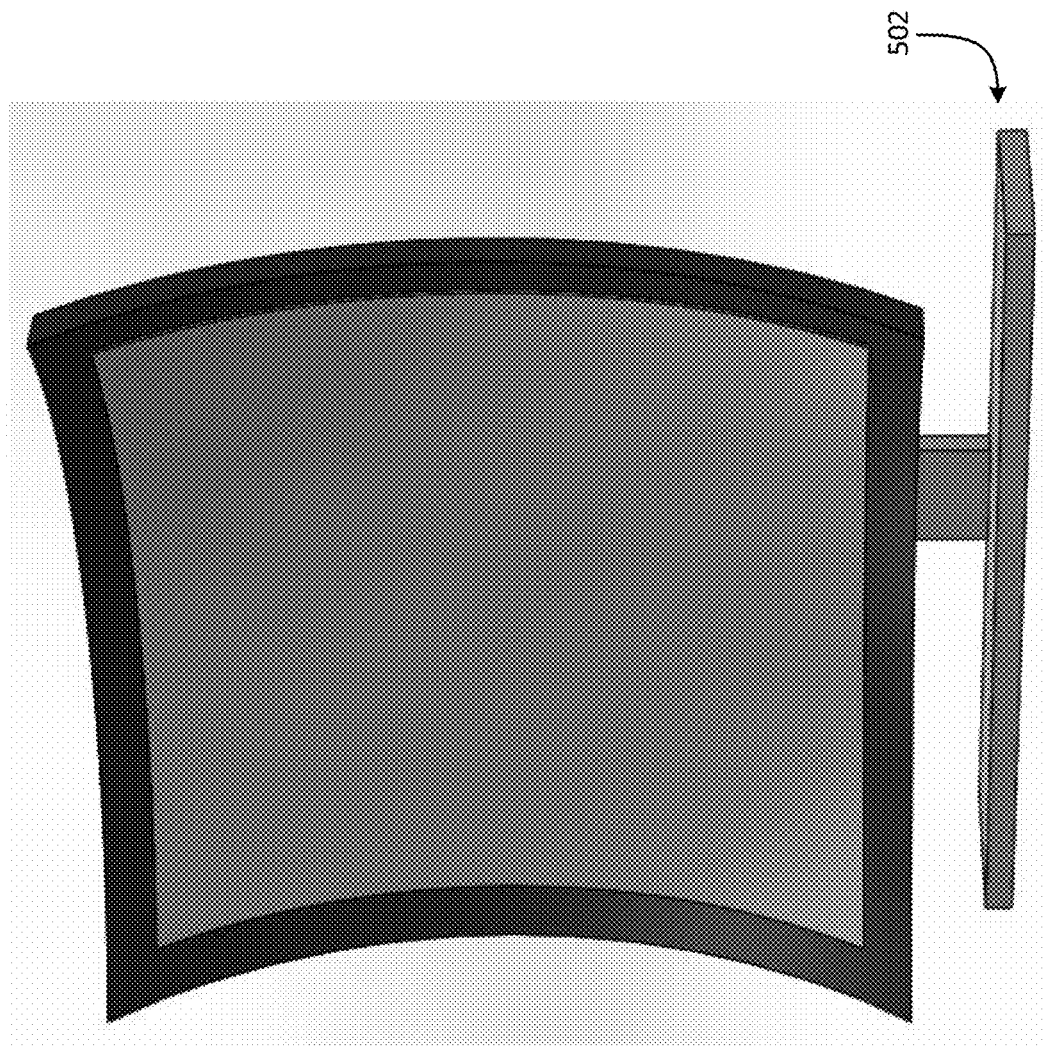
FIG. 5 illustrates a perspective view of a display according to an example.

As discussed above, in some examples the base 106 may include one or more wired or wireless connections or ports. In various examples, the base 106 may include a docking station having one or more power and/or data connections to connect to a computing device, such as a laptop computer. A physical configuration of the base 106 may be a non-limiting feature, and other physical configurations of the base 106 are within the scope of the disclosure. For example, FIG. 5 illustrates a display 500 having a rectangular base 502 rather than the legs 108 illustrated in FIGS. 1-4.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An electronic display configured to output information to a user, the electronic display comprising:
a display screen having a plurality of pixels and being curved in a first dimension and a second dimension aligned with a field-of-view of the user, the first dimension being perpendicular to the second dimension, wherein each pixel of the plurality of pixels is configured to output electromagnetic radiation along an axis non-parallel to an axis along which each other pixel of the plurality of pixels outputs electromagnetic radiation.

2. The electronic display of claim 1, wherein the display screen is spherical.

3. The electronic display of claim 2, wherein a width of the display screen is equal to a length of the display screen.

4. The electronic display of claim 2, wherein a width of the display screen is greater than a length of the display screen.

5. The electronic display of claim 1, wherein the display screen is aspherical.

6. The electronic display of claim 5, wherein a width of the display screen is equal to a length of the display screen.

7. The electronic display of claim 6, wherein a curvature of the display screen in the first dimension is greater than a curvature of the display screen in the second dimension.

8. The electronic display of claim 5, wherein a width of the display screen is greater than a length of the display screen.

9. The electronic display of claim 8, wherein a curvature of the display screen in the first dimension is greater than a curvature of the display screen in the second dimension.

10. The electronic display of claim 9, wherein the width of the display screen is measured along the second dimension.

11. The electronic display of claim 1, wherein a curvature radius of the display screen is configured to be equal to a depth of the field-of-view of a viewer.

12. The electronic display of claim 1, wherein the plurality of pixels includes a first plurality of pixels being arranged along a first arc curving along the first dimension and a second plurality of pixels being arranged along a second arc curving along the second dimension.

* * * * *